(No Model.)

F. FOX.

ORE SEPARATOR.

No. 342,741. Patented May 25, 1886.

Witnesses:
E. G. Asmus
R. Platz

Inventor:
Frank Fox
By Stuart & Underwood
Attorneys.

UNITED STATES PATENT OFFICE.

FRANK FOX, OF ASHLAND, WISCONSIN.

ORE-SEPARATOR.

SPECIFICATION forming part of Letters Patent No. 342,741, dated May 25, 1886.

Application filed June 11, 1885. Serial No. 168,316. (No model.)

*To all whom it may concern:*

Be it known that I, FRANK FOX, of Ashland, in the county of Ashland, and in the State of Wisconsin, have invented certain new and useful Improvements in Ore-Separators; and I do hereby declare that the following is a full, clear, and exact description thereof.

My invention relates to devices for washing ores, and will be fully described and claimed hereinafter.

Figure 1:
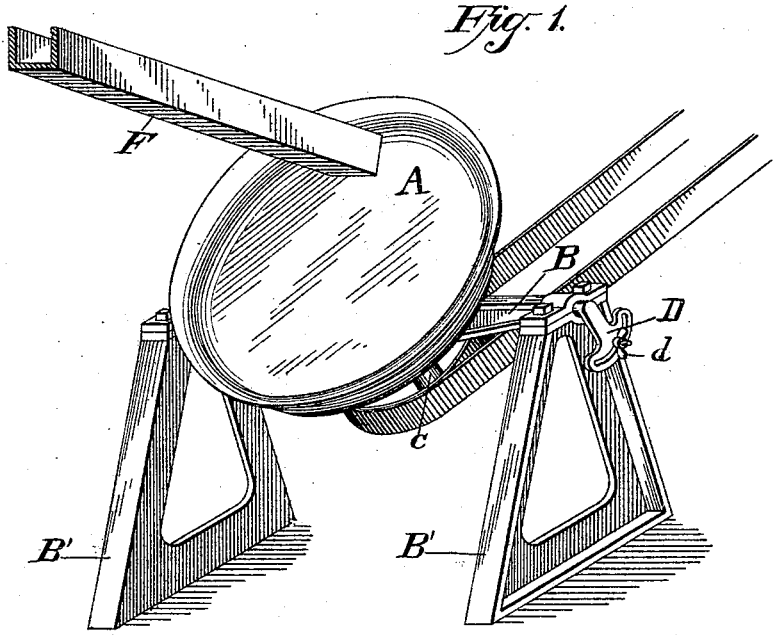
Figure 2:
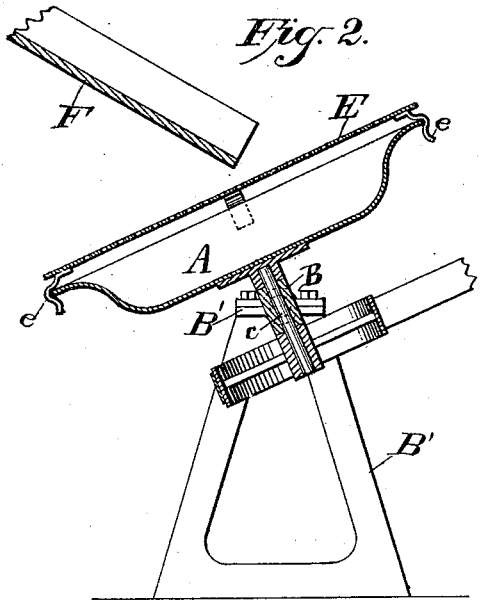

In the drawings, Figure 1 is a perspective view of my device, and Fig. 2 is a vertical central section.

A is a pan, which is secured upon an adjustable bar, B, by a shaft, $c$, that passes through said bar, and on its lower end this shaft carries a driving-pulley that is belted to any suitable source of power. The adjustable bar is trunnioned in standards B', and is held in adjustment to give the desired inclination to the pan by a slotted crank, D, and set-nut $d$. Where the slime to be washed has heavy stones mixed with it, I provide a perforated cover, E, which may be secured to the pan by clips $e$, or in any other suitable manner; or this cover may be suspended above the pan, and may be suspended in such a way as to be capable of revolving independently of the pan. F is the chute by which the slime is conducted to the pan. The right inclination is given to the pan to suit the material to be washed by means of the slotted crank D and nut $d$, and then the belt is thrown onto the pulley and the pan begins to revolve. The slime may now be thrown into the chute, from whence it falls to the pan, and while the lighter portion of the slime will be thrown out and over the edge of the pan by centrifugal force the heavier portion will gravitate to the bottom of the pan, the heavier portion being that which contains the metal.

I am aware that heretofore ore-washers have been devised in which the pan is rotated by a central supporting-shaft; but in such previous devices the bearings of this shaft have also been arranged to rotate or oscillate constantly, so as to prevent the possibility of any constant center of rotation of the pan. This constant change in the center of rotation is not only unnecessary, but involves greater or less complication of parts and corresponding increase in cost of the machine.

By virtue of my construction this class of machines is greatly simplified and their expense greatly reduced, while the center of rotation can be changed as frequently as desired.

Having thus described my invention, what I claim as new, and desire to secure by Letters Patent, is—

1. In an ore-washing machine, a revolving pan having an actuating shaft constituting its center of rotation, and an adjustable bar constituting the support and bearing for the actuating-shaft, said bar being provided with means for holding it rigidly in any position of adjustment, substantially as described.

2. The combination, with the standards B', the horizontal axially-adjustable bar B, having slotted crank D and the set-nut $d$, of the shaft $c$, having its support and bearing in bar B, and carrying the pan A and driving-pulley, substantially as specified.

In testimony that I claim the foregoing I have hereunto set my hand, at Ashland, in the county of Ashland and State of Wisconsin, in the presence of two witnesses.

FRANK FOX.

Witnesses:
 S. S. VAUGHN,
 W. R. DURFEE.